United States Patent [19]

Palmers

[11] Patent Number: 4,707,988
[45] Date of Patent: Nov. 24, 1987

[54] DEVICE IN HYDRAULICALLY DRIVEN MACHINES

[76] Inventor: Göran Palmers, Hållstamsvägen 35, S-436 00 Askim, Sweden

[21] Appl. No.: 662,407
[22] PCT Filed: Feb. 2, 1984
[86] PCT No.: PCT/SE84/00032
 § 371 Date: Oct. 3, 1984
 § 102(e) Date: Oct. 3, 1984
[87] PCT Pub. No.: WO84/03127
 PCT Pub. Date: Aug. 16, 1984

[30] Foreign Application Priority Data

Feb. 3, 1983 [SE] Sweden .................... 83000567

[51] Int. Cl.$^4$ ........................................ F16D 31/02
[52] U.S. Cl. ............................... 60/413; 60/476
[58] Field of Search ............... 60/414, 413, 417, 416, 60/371, 476, 473, 415, 418

[56] References Cited

U.S. PATENT DOCUMENTS

| | | | |
|---|---|---|---|
| 2,566,381 | 9/1951 | Svenson | 60/417 |
| 3,855,791 | 12/1974 | Quinto | 60/476 X |
| 4,110,982 | 9/1978 | Regar | 60/413 |
| 4,512,149 | 4/1985 | Weaver | 60/371 |

FOREIGN PATENT DOCUMENTS

| | | |
|---|---|---|
| 0053370 | 6/1982 | European Pat. Off. . |
| 0091801 | 10/1983 | European Pat. Off. . |
| 1703965 | 8/1983 | Fed. Rep. of Germany . |
| 0113802 | 9/1981 | Japan ........................ 60/413 |
| 0802669 | 2/1981 | U.S.S.R. ..................... 60/416 |
| 0900056 | 1/1982 | U.S.S.R. ..................... 60/416 |

OTHER PUBLICATIONS

Patent Abstract of Japan, vol. 4, No. 57, Apr. 26, 1980, JP-A-55-24218.

*Primary Examiner*—Edward K. Look
*Attorney, Agent, or Firm*—Cushman, Darby & Cushman

[57] ABSTRACT

A device in machines (1) which are driven by means of a hydraulic cylinder, such as hydraulic presses and the like, and which has at least one pump (5) for the hydraulic fluid which pump is driven by a driving machine (6) through an energy accumulator, for example a flywheel (7). The object of the invention is to provide a considerable energy saving and recovery of energy. This has been achieved by at least one driving unit (5) connectable to the hydraulic system in the machine, said driving unit being arranged to bring back the elastically stored energy in the machine to the energy accumulator (7) during the decompression phase of the machine.

2 Claims, 4 Drawing Figures

DEVICE IN HYDRAULICALLY DRIVEN MACHINES

SUMMARY OF THE INVENTION

The present invention relates to a device in machines which are driven by means of a hydraulic cylinder, such as hydraulic presses and the like, with at least one pump driven by a driving motor through an energy accumulator, i.e., a fly wheel for the hydraulic fluid.

BACKGROUND OF THE INVENTION

Energy storing by means of a fly wheel is utilized today at excenter presses and has been proposed for large hydraulic presses (DE-A1 No. 1.627.843). In such hydraulic driven presses a fly wheel is arranged between the electric motor and the pump for the hydraulic fluid in such a way that the electric motor which is necessary for the operation may be constructed relatively small whereby an essential saving of power may be achieved. The pump must be dimensioned with respect to the highest pressure which may occur and for that reason may be comparatively large but since the pressing work is executed by the fly wheel the electric motor needs only be dimensioned for the movement of the piston. By this design, a power saving is achieved which in itself is valuable, but there is no energy saving because a small part (a few percent) of the energy provided is converted to useful work and the larger part is consequently lost.

The same applies for such driving devices for presses which use pressure accumulators for storing energy at a small total effect. An example of such a device is disclosed in No. SE-8-7513069-0, where the energy stored in the pressure accumulator is completely utilized, as it is not necessary to use a throttling device for converting the existing pressure in the accumulator. There is, however, no recovery of energy provided with this device.

A common measure in hydraulic plants is to arrange the quick transport of the piston in a press by means of an accumulator. During the return stroke the force is only a few percent of the total pressing force at which the accumulator is loaded. This plant only admits an insignificant storing of energy and no recovery of energy at all.

The object of the invention is to provide an essential energy saving, i.e. recovering of energy, at the same time as the previous advantageously power saving is maintained or even is further improved. This has been achieved whereby at least one driving unit connectable to the hydraulic system in the machine is arranged to bring back the elastically stored energy in the machine to the energy accumulator (7) during the decompression phase of the machine.

Through the invention the following advantages are achieved: the energy saving is obtained while the hydraulic pump during the decompression phase is working as a hydraulic motor, whereby an energy recover of between 60-90% is obtained. The power saving is of the same size and is obtained by that the connnecting power for the electric motor or motors may be decreased, which results in considerable savings in the costs for installation and connection. Further important savings of costs may be obtained for cooling of the hydraulic oil if the water for the cooling must be bought. Dependent on the water costs this saving may be up to three times higher than the saving on the electric side.

DETAILED DESCRIPTION

Figure 1:
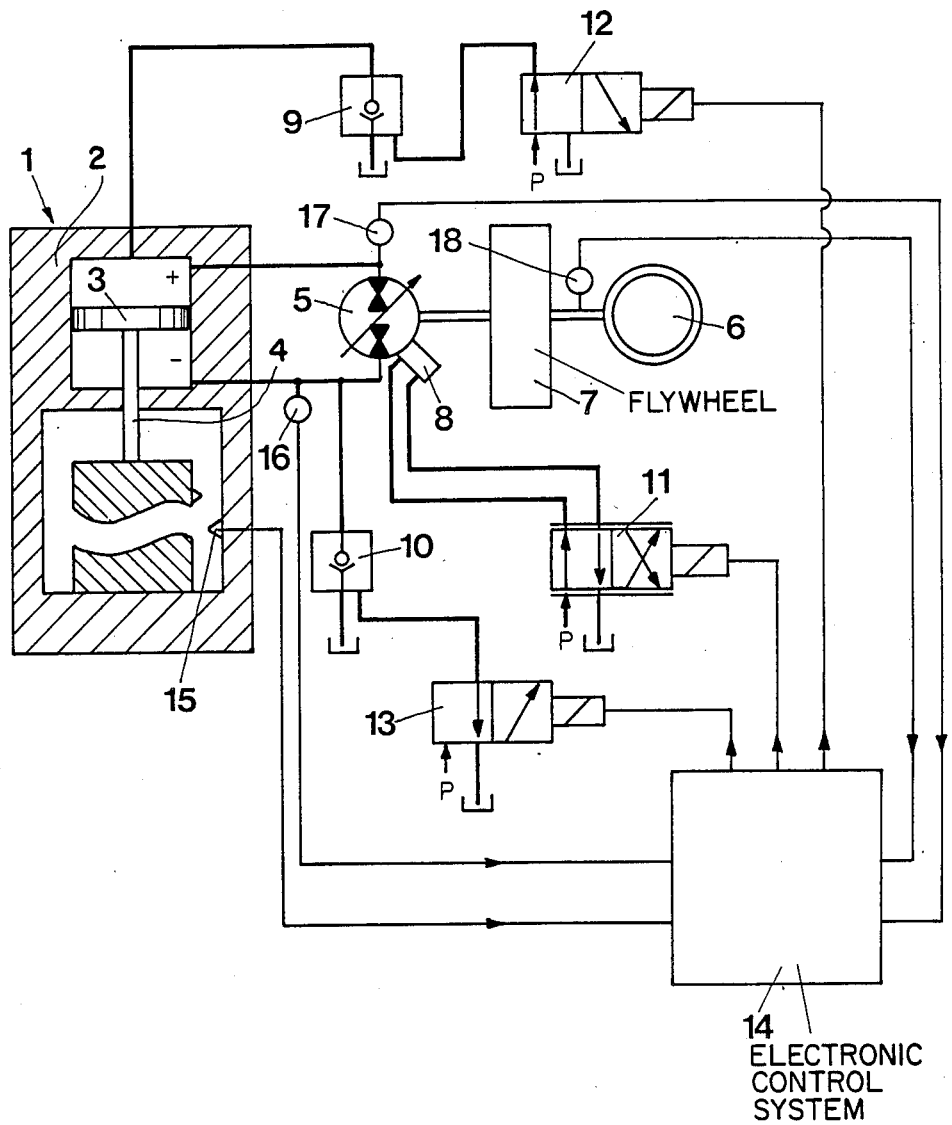
FIG. 1 shows a circuit diagram of the device according to the invention applied to a hydraulic press.

In the drawing, 1 denotes a hydraulically driven machine, e.g. an hydraulic press, including a hydraulic cylinder 2 in which a piston 3 with piston rod 4 is displaceable. A variable displacement pump for the hydraulic fluid is denoted with 5, said pump is driven by an electric motor 6 by means of a mechanical energy accumulator, i.e. a fly wheel 7. The pump 5 is provided with an adjustment element 8 in the form of a hydraulic servo, by means of which the pump may be changed from pump drive to power drive at unchanged direction of rotation of the incoming driving shaft of the pump, i.e. the shaft which is connected to the fly wheel 7.

The hydraulic system further includes two pressure controlled stop valves 9 and 10 and electrically controlled direction valves 11, 12 and 13 for controlling on one hand the adjustment element 8 and on the other hand both pressure controlled stop valves 9, 10, respectively. An electronic control system for controlling the adjustment element 8 and the stop valves 9 and 10 is denoted 14, and are controlled dependent on the signals from position detector 15, which emits a signal related to the position or detects when the hydraulic press 1 has performed its movement, and from pressure detectors 16 and 17, which detects the hydraulic pressure at the inlet and outlet sides of the pump 5, and from a revolution indicator 18, which gives information about the rotational speed of the fly wheel. The adjustment wheel 8 is controlled depending on these incoming signals in such a way that when the decompression phase is started hydraulic fluid from the plus side of the cylinder 2 is fed to the pump in such a way that it will work as a hydraulic motor. Thereby the fly wheel will receive additional energy which is stored elastically in the hydraulic press 1.

This return of energy will cause the electric motor 6 to accelerate, which means that it must be designed to withstand these changes in velocity and without that it works as a generator. One possibility is to use a continuous-current motor as an electric motor, or to disconnect the electric motor during the decompression phase by means of a free wheel.

During the compression phase hydraulic fluid is supplied to the plus side of the piston chamber by the pump 5 from the minus side of the piston chamber. The stop valve 9 is closed. If additional fluid has to be supplied to the pump 5, the stop valve 10 opens by a signal from the pressure detector 16 by way of the direction valves.

During the compression phase energy is elastically stored in the hydraulic press. In a hydraulic press tested by the applicant this elastically stored energy amounts to about 0.6 kWh for one stroke and to a resilience of about 22 mm (10 mm in the frame and 12 mm in the hydraulic system). This elastically stored energy is at the beginning of the decompression phase brought back to the hydraulic system by feeding fluid from the plus side of the piston chamber to the pump 5 so that the pump will work as a hydraulic motor to supply energy to the flywheel 7. The stop valve 10 is open, so that fluid may be evacuated therethrough. The stop valve 9 is closed.

During the return phase fluid is supplied to the minus side from the plus side of the piston chamber by the pump 5. Stop valve 10 is closed, while stop valve 9 is open for supplying additional fluid to the pump 5 if required.

The stop valves 9 and 10 are so called pressure controlled stop valves, which can be opened for a flow from above (according to the figure) by a signal from the direction valves 12 and 13, respectively, which are controlled by the pressure detectors 16 and 17 and by the position detector 15.

The signals from the piston detector 15, the pressure detectors 16 and 17 and the revolution indicator 18 are emitted to the electronic control system 14 which gives control signals to the direction valves 11, 12 and 13. The electronic control system 14 is of a conventional kind well-known in hydraulic systems.

Except for the above advantages concerning energy and power saving also a more soft operation, a more simple cooling system for the hydraulic oil and essentially lower connection costs and power charges for the electric motor are achieved. A conventional plant, which for instance needs a pumping power of 800 kW divided into 4 electric motors, each of 150 kW, may be driven by only one electric motor of 150 kW according to the invention which means a saving of the costs to buy and install three electric motors and the corresponding connection and power charges. Expressed in economic terms the difference in costs between different systems for a 20,000 ton press would be significant, as is evident from table No. 1.

The capitalized value for the above mentioned 20,000 tons press with flywheel and energy recovery can be calculated as follows:

Profit for a machine placed in Sweden:
Difference in investment costs:

661.000 − 536.000 = 125.000 SEK

Difference in operating costs per year and 2-shift:

215.000 − 75.000 = 140.000 SEK/year

The capitalized value will be
in 10 years and 4% real interest
8.11 × 140.000 + 125.00 = 1.260.00 SEK
in 20 years and 4% real interest
13.59 × 140.000 + 125.00 = 2.030.000 SEK
in 10 years and 7% real interest
7.02 × 140.000 + 125000 = 1.100.000 SEK
in 20 years and 7% real interest
10.05 × 140.000 + 125.00 = 1.600.00 SEK Profit for a machine placed in Japan:

In Japan where the electricity charges for the industry is 69 ore/kwh, the difference in operating costs at 2-shift will be 485.000 + 75.000 − (207.000 + 15.000) = 338.000 SEK/year.

in 10 years and 4% real interest
11 × 338.000 − 125.000 = 2.870.000 SEK
in 20 years and 4% real interest 13.59 × 338.000 + 125.000 = 4.720.000 SEK
in 10 years and 7% real interest
7.02 × 338.000 + 125.000 = 2.500.000 SEK
in 20 years and 7% real interest
10.05 × 338.000 + 125.000 = 3.700.000 SEK TABLE No. 1

Calculation of differences in costs for a 20,000 tons heat exchanger press

| | Conventional system | | Conventional system with flywheel bearing | | Flywheel & recovery acc. to the invention | |
| --- | --- | --- | --- | --- | --- | --- |
| | Installation | Operation | Installation | Operation costs | Installation | Operation costs |
| Max el power | 720 kw | | 250 kw | | 140 kw | |
| Mean el power | 234 | | 220 | | 100 | |
| Rated power | 600 | | 240 | | 120 | |
| El. installation | 430.000 SEK | | 173.000 SEK | | 87.000 SEK | |
| Hydaulic Pumps | 130.000 | | 190.000 | | 332.000 | |
| Air-oil-coding | 101.000 | | 101.000 | | 40.000 | |
| Flywheel | — | | 37.000 | | 37.000 | |
| Extra contol system | — | | 20.000 | | 40.000 | |
| Power charge | | 75.000 SEK/year | | 30.000 SEK/year - | | 15.000 SEK/year |
| Energy charge | | | | | | |
| 1-shift | | (70.000) | | (70.000) | | (30.000) |
| 2-shift | | (140.000) | | (140.000) | | 60.000 |
| 2-shift ½ load | | (88.000) | | (88.000) | | (46.000) |
| 2-shift Japan | | (485.000) | | (485.000) | | (207.000) |
| | 661.000 SEK | 215.000 SEK/y | 521.000 SEK | 170.000 SEK | 536.000 SEK/year | 75.000 SEK/year |

Figure 2:
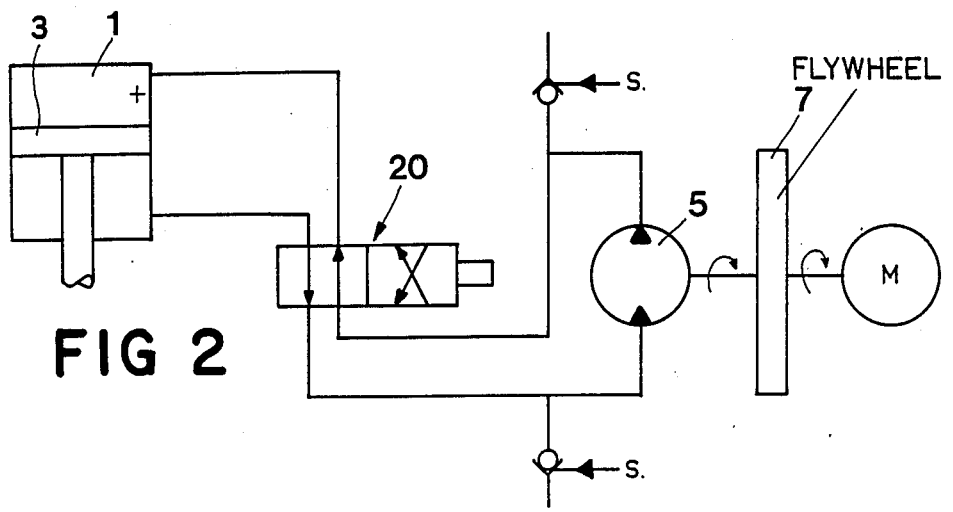
FIG. 2-4 shows schematic circuit diagrams of other embodiments of the device according to the invention.

The embodiment shown in FIG. 2, in which only the parts of the circuit diagram, important for energy recovery are shown, differs from the embodiment of FIG. 1 by the fact that a control valve 20 is arranged in the hydraulic circuit between the hydraulically driven machine 1 and pump 5. The control valve 20 is a four-way valve and is arranged to in the moment the decompression phase is started to be switched over so that the direction of flow of the hydraulic oil from the plus side of the piston 3 is supplied to the inlet of the pump 5, so that this will operate as a hydraulic motor and transfers its energy content to the flywheel.

Figure 3:
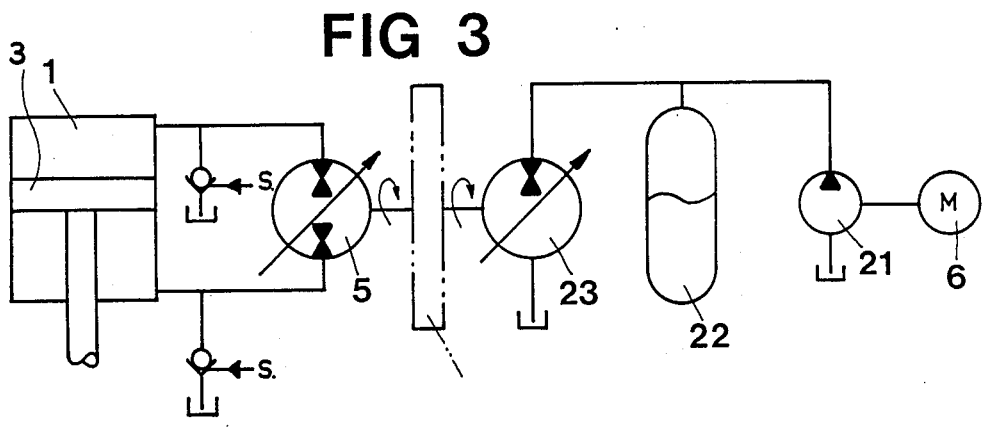

In the embodiment shown in FIG. 3 a hydraulic pump 21 driven by a motor 6, a pressure accumulator 22 and a hydraulic motor 23 is included in a first hydraulic circuit, while the hydraulic pump 5 mechanically driven by the hydraulic motor 23 and the hydraulic cylinder 1 form a second hydraulic circuit. For operation technical reasons it is appropriate to arrange a flywheel 7 between the hydraulic motor 23 and the hydraulic pump 5 and to design the hydraulic pump 5 so that it can be driven as a hydraulic motor at unchanged direction of rotation of the flywheel 7.

It is also possible to exclude the flywheel 7 and instead design the hydraulic motor 23 in such a way that it operates as a hydraulic pump and loads the pressure accumulator 22.

Figure 4:
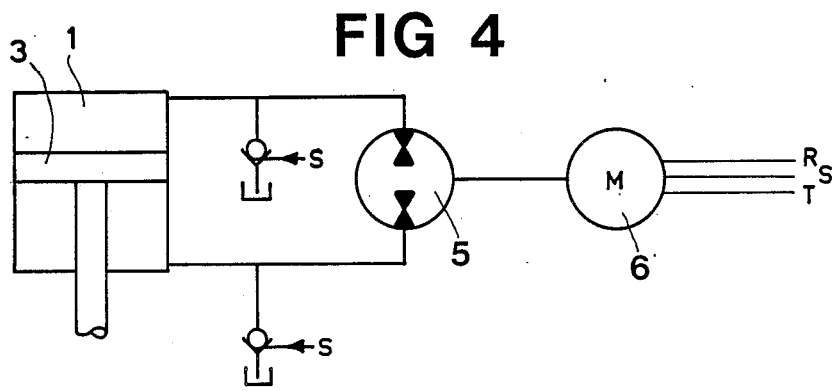

In the embodiment shown in FIG. 4 the driving unit can operate either as a hydraulic pump or as a hydraulic motor dependent on from which direction the pressure medium is supplied to the driving unit. The energy recovered at the decompression phase and which by the hydraulic motor 5 is converted to rotational energy is in this embodiment supplied to the electric motor of the driving unit 5, which is so designed that it can also work as a generator and then emits the current generated to the power supply. This type of energy recovery can be appropriate in industries which have a very high consumption of electricity and where the electric power generated by the generator can be directly supplied to internal machines.

Instead of using the pump 5 as a hydraulic motor, which not always can be done, it is possible to arrange a separate hydraulic motor, which is connected in parallel with the pump and which by means of an adjustment device is connected to the hydraulic system of the cylinder when the decompression phase begins. If the driving machine is a hydraulic motor, this can be used also for the energy return.

The invention is not limited to the disclosed embodiment, but a number of alternatives are possible within the scope of the claims. Thus, the device according to the invention may be used at other hydraulically driven machines than hydraulic presses and any kind of driving machine can be used instead of an electric motor for driving of the flying wheel and the pump.

I claim:

1. An energy recovery device for machines operated by variable fluid pressure such as hydraulic presses which are driven by a hydraulic piston and cylinder means, said device further comprising:

at least one hydraulic pump/motor unit for the hydraulic fluid;

a motor for driving the pump;

a flywheel energy accumulator associated with said motor;

an adjustment device for switching said pump/motor unit in relation to the position of the hydraulic piston after a full working cycle from pumping work to motor work at unchanged direction of rotation, so that the unit, at least during the beginning of the decompression phase of the machine, works as a motor which via the pressurized oil in the hydraulic system brings back the elastically stored energy in the machine to the flywheel.

2. In a hydraulically operated machine having a piston and cylinder assembly wherein there is a hydraulic fluid pressure chamber which is decompressed at the end of an operating cycle of the machine: a rotary hydraulic pump and a conduit connected between said pump and said pressure chamber for supplying fluid pressure to said pressure chamber; a rotary motor having a rotary drive connection connected to said pump; a flywheel energy accumulator driven by said drive connection; and means for utilizing the elastically stored energy in said pressure chamber upon decompression thereof, said means including a device operable, upon decompression of said pressure chamber, to change said pump so as to operate as a motor with said pump and drive connection continuing to rotate in the same direction as when said pump operates as a pump whereby hydraulic fluid flows from said pressure chamber through said conduit to said pump and drives the latter as a motor so that energy is transmitted through said drive connection to said flywheel.

* * * * *